Figure 1:
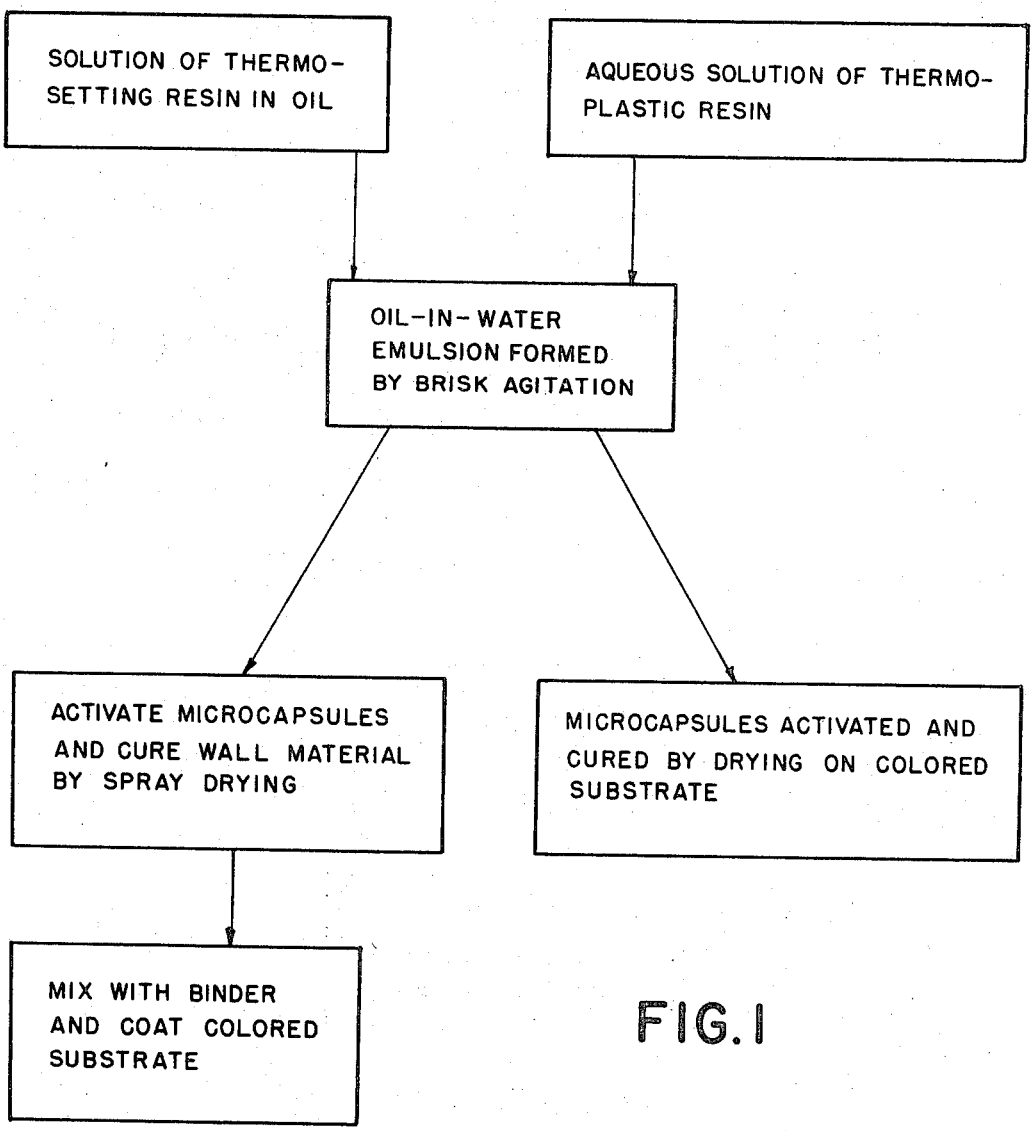

United States Patent [19]

Powell et al.

[11] 3,819,398

[45] June 25, 1974

[54] PROCESS FOR PRODUCTION OF PRESSURE-SENSITIVE COPY SHEET

[75] Inventors: Mabrin P. Powell, Chicago; Mark R. Nauman, Lake Forest, both of Ill.

[73] Assignee: Champion International Corporation, New York, N.Y.

[22] Filed: Apr. 28, 1972

[21] Appl. No.: 248,594

Related U.S. Application Data

[62] Division of Ser. No. 55,924, July 17, 1970, Pat. No. 3,686,015.

[52] U.S. Cl. .......................... 117/36.7, 117/155 L
[51] Int. Cl. ....................... B41m 5/16, B41m 5/18
[58] Field of Search ......................... 117/36.2, 36.7

[56] References Cited
UNITED STATES PATENTS

| | | | |
|---|---|---|---|
| 2,957,791 | 10/1960 | Bechtold | 117/36.7 |
| 2,961,334 | 11/1960 | Clancy et al. | 117/36.7 |
| 3,016,308 | 1/1962 | Macaulay | 117/36.1 |
| 3,243,784 | 3/1966 | Anderson et al. | 117/36.7 |
| 3,418,656 | 12/1968 | Vassiliades | 117/36.2 |
| 3,686,015 | 8/1972 | Powell et al. | 117/36.7 |

*Primary Examiner*—Murray Katz
*Attorney, Agent, or Firm*—Roylance, Abrams, Berdo & Kaul

[57] ABSTRACT

A dry, pressure-sensitive copy system is provided by coating discrete, substantially spherical air-containing microcapsular opacifying agents having controlled structural integrity onto a colored surface. Localized application of pressure to the coating causes destruction of the opacifying agents and exposes the underlying colored surface at the points of pressure application thereby producing an image.

16 Claims, 4 Drawing Figures

PATENTED JUN 25 1974 3,819,398
SHEET 2 OF 2
FIG. 2
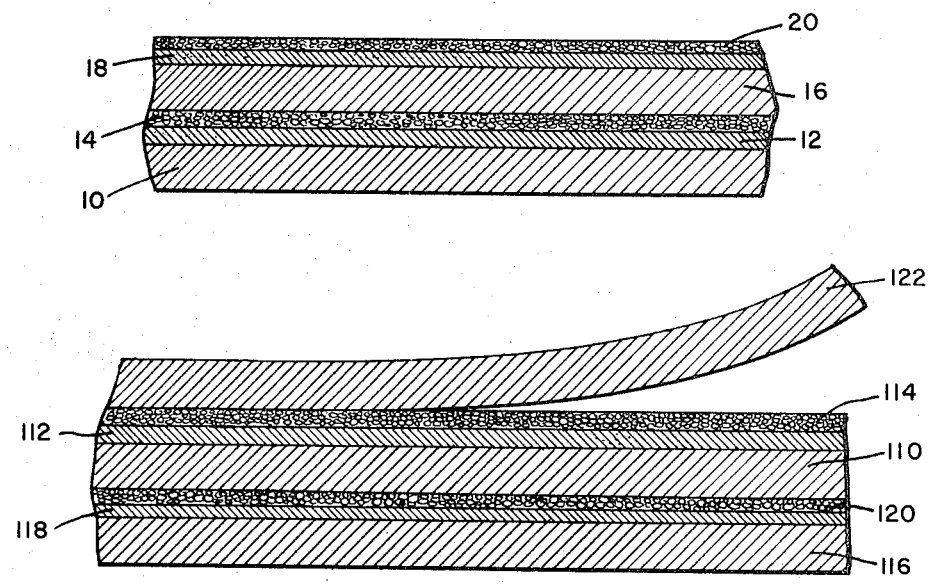
FIG. 3
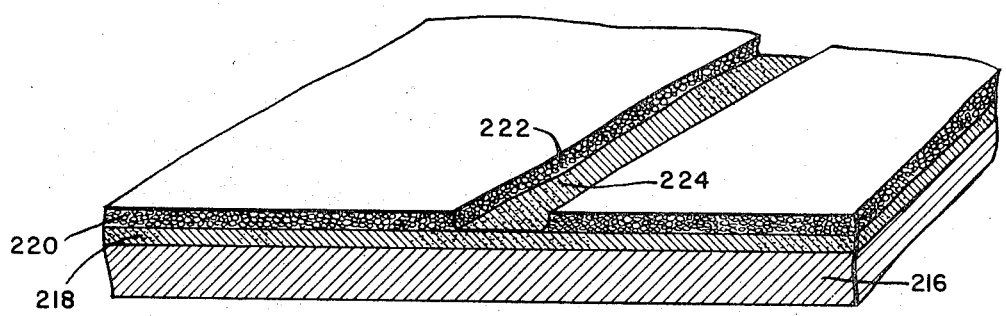
FIG. 4

PROCESS FOR PRODUCTION OF PRESSURE-SENSITIVE COPY SHEET

This is a division of application Ser. No. 55,924 filed July 17, 1970, now U.S. Pat. No. 3,686,015.

This invention relates to pressure-responsive copy systems. More particularly, this invention relates to dry, pressure-responsive coatings capable of producing a visible colored mark at the point of pressure application.

Microcapsules containing both liquid and solid nucleus materials have been employed in a variety of applications. For example, such microcapsules have been used extensively in adhesives, adhesive tapes, fertilizers, pharmaceuticals, foods and cosmetics. Microcapsules have found particular utility in the art of transfer-copy systems wherein minute droplets of a colorless dye intermediate are dispersed or dissolved in an oil and the droplets are encapsulated and the capsules are then coated onto a transfer sheet. The dye intermediate may be thereafter transferred to a copy sheet by rupturing the microcapsules. The underlying copy sheet has an adsorbent coating thereon that contains a material which will react with the dye intermediate by causing the visible colored mark at points where the microcapsules have been ruptured and the dye transferred. Thus, such systems are "wet" systems, in as much as they rely upon the transfer of a liquid, e.g., a dye intermediate to an adsorbent coating for the production of a colored mark. Thus, for example, certain prior transfer copy systems have required two coatings, viz., a liquid dye-containing microcapsular coating on a transfer sheet and an adsorbent coating on a copy sheet. Such systems are prone to various inherent difficulties including the tendency of the dye intermediate to degrade or decompose upon prolonged exposure to heat and light, and the tendency of the dye intermediate to prematurely go from a colorless form due to atmospheric contamination of the dye intermediate while it is contained in the microcapsule. Accordingly, it would be highly desirable to provide a "dry," pressure-sensitive copy system capable of producing a colored marking with all the advantages of prior microcapsular systems, but without the aforesaid disadvantages of such systems.

It has now been found that a dry, pressure-sensitive copy system may be realized by providing a substrate with a coating comprising substantially discrete, spherical air-containing microcapsular opacifying agents having an average particle diameter below about 1 micron, said opacifying agents having a substantially uniform structural integrity which renders said opacifying agents destructible under a predetermined, localized pressure, said substrate having a colored surface which is exposed upon destruction of the opacifying agents.

Thus, the application of pressure to the microcapsular coating by means of an ordinary stylus or typewriter causes the destruction of the substantially spherical air-containing microcapsular opacifier and results in the exposure of the colored substrate at the point of pressure application, thereby providing a legible and stable image.

Likewise, a manifold pressure-sensitive copy system may be provided which comprises a plurality of sheets in a superposed relationship, wherein at least one of said sheets comprises a substrate having provided thereon a coating comprising substantially spherical, air-containing microcapsular agents having an average particle diameter below about 1 micron, said substrate having a colored surface. The top sheet may be ordinary sheet of paper having no special coating, and at least one copy sheet comprising a colored substrate having a coating of the opacifying agents is provided in a superposed arrangement under the said top sheet. Alternatively, all sheets, including the top sheet, may be copy sheets thereby eliminating the necessity for a typewriter ribbon, when employing the present record system in a typewriter.

The copy system of the present invention has many decided advantages over prior copy systems. For example, the microcapsular opacifiers may be produced with a structural integrity such that they are capable of being ruptured at predetermined pressures. In addition, the microcapsular opacifying agents may be produced having a substantially uniform particle diameter thereby providing uniform response to pressure when coated onto the particular substrate. Thus, a uniformity in the mark or marks will result in the copy sheet provided with such coating. Still another advantage of the present system is that the opacifying agents are substantially spherical in shape and will provide a surface which has excellent opacity and hiding power. Not until the microcapsular opacifier is destroyed does the hidden, underlying, colored substrate become exposed and thereby provide an image.

In addition to the destruction of the spherical, air-containing microcapsular opacifying agents, at least a portion of the ruptured capsules on underlying copy sheets may be transferred to the sheets superimposed thereon. The degree of transfer of the capsule debris will depend upon the amount of localized pressure applied, the nature of the back surface of the superimposed sheet, the nature of the microcapsular coating, the amount of binder employed, etc. Thus, for example, the addition of regulated amounts of a binder to the microcapsular dispersion prior to coating can prevent transfer of the ruptured microcapsules to the back surface of the superposed sheet.

It should be noted that prior proposals have been made for providing opaque coatings which are heat and pressure sensitive. Thus, for example, blush coatings have been provided employing a blushed lacquer coating wherein the evaporation of a solvent causes the formation of a white, opaque coating. Likewise, opaque coatings comprising voids or bubbles in a cellular structure have been employed to provide opacity and may be made transparent by collapse of the voids. However, such coatings have the decided disadvantage in that it is difficult to obtain uniform results. In contradistinction thereto, the opacifying agents of the present invention are formed into substantially spherical opacifiers having a structural integrity disigned to give a predetermined and uniform response to pressure. This affords much greater control over the ultimate pressure responsiveness of the copy sheet than heretofore obtainable. Accordingly, the copy paper of the present invention requires no special handling techniques to avoid multilation of the final product.

The microcapsular opacifying agents of the present invention are prepared by forming oil-containing precursor microcapsules according to any suitable means and than activating the microcapsules in a manner hereinafter described to provide air in the microcapsular core. Suitable precursor microcapsules may be provided, for example, by a method which involves simply admixing:

a. an oily solution comprising an oil-soluble, partially-condensed, thermosetting condensation product in a water-immiscible oily material; and
b. an aqueous solution of a water-soluble polymeric material;

thereby forming an emulsion, said thermosetting condensation product and said water-soluble polymeric material being capable of interacting to form a solid, cross-linked resinous material, subjecting said emulsion to conditions whereby said polymeric materials react to form precursor microcapsules having solid capsular walls about a nucleus of said oily material, and activatinj the microcapsules to provide microcapsular opacifying agents.

The oil-containing precursor microcapsules may be activated by any suitable means, e.g., by spray-drying, to drive the oily core material through the still porous walls of the microcapsule and replace the oil with air.

The microcapsular opacifiers employed in the practice of the present invention comprise discrete, essentially spherical, air-containing microcapsules having substantially continuous, solid walls and have an average particle diameter below about 1 micron. The term "substantially continuous solid walls" as employed herein is intended to include solid-walled microcapsules which are still sufficiently porous to permit the escape of a core material in gaseous form therethrough upon the application of heat. The oily core material passes through the micropores of the capsule and is replaced therein with air. The core materials that may be employed in the production of the present air-containing microcapsules are more particularly defined hereinafter.

The air-containing microcapsule opacifiers employed in the present invention may be produced by a method which comprises providing discrete, essentially spherical precursor microcapsules having substantially continuous walls, said microcapsules having an average particle diameter of below about 1 micron and containing a core material, such as a water-immiscible oily material selected from the group consisting of liquid and low melting oils, fats, and waxes, or a water-miscible liquid, such as, low molecular weight alcohols, ketones, etc., and heating the microcapsules to a temperature sufficient to substantially completely drive off the water-immiscible oily core material from the microcapsules.

As previously mentioned, the oily core material, e.g., a water-immiscible oily material, in the precursor microcapsules is driven from the microcapsules and is replaced by air. By "water-immiscible oily materials," as employed herein, is meant lipophilic materials which are preferably liquid, such as oils which will not mix with water and which can be driven through the porous walls of the particular precursor microcapsules employed. The discrete microcapsules of the present invention may be provided with low melting fats and waxes as the lipophilic material. However, oils are the preferred core material, since they do not require special temperature maintenance during the production of the microcapsules. Furthermore, oils are more easily volatilized and driven through the micropores of the walls of the microcapsules by the application of heat.

In general, the lipophilic nucleus materials may be natural or synthetic oils, fats, and waxes or any combination thereof which can be removed from the microcapsules at the desired temperatures. Among the materials that can be employed in the process of the present invention are: aliphatic hydrocarbons, for example, heptane, octane, decane or mixtures of such materials, for example, mineral spirit products and the like.

The preferred lipophilic materials for employment in the present invention are those oils having a fairly high vapor pressure (high volatility), so that they can be complete and easily expelled through the micropores of the solid-walled microcapsules over a wide range of temperatures, e.g., by the application of moderate amounts of heat, e.g., −32° to 180°C., preferably between about 0° to about 100°C. It is especially preferred to employ oils which can be driven from the microcapsules at temperatures conventionally employed in the drying of paper webs or paper coatings, e.g., about 85°C. Preferred oils for use in the present invention include mineral spirits, benzene, xylene, toluene, styrene, tupentine, and oils having a like volatility.

The water-soluble polymeric material mentioned above acts both as an emulsifying agent and as an encapsulating agent. Thus, the water-soluble polymeric material acts as an emulsifying agents and may be characterized as being "amphiphilic." That is, while the water-soluble polymer is generally preferentially soluble in one phase of the emulsion, it possesses an appreciable affinity for the other phase. It can be said, then, that an ampiphilic emulsifier gives oil a more hydrophilic nature than it had before, and conversely, gives water a more lipophilic nature. Likewise, the water-soluble polymeric material reacts with the formaldehyde condensation polymer to form the capsule wall.

The preferred thermoplasitc, water-soluble polymers include the ammonium salt of styrene-maleic acid, polyvinyl alcohol, methyl cellulose, hydroxyethyl cellulose, substituted starches, e.g., starches substituted with hydrophobic groups, benzyl substituted starch, and the like.

The pressure responsiveness of the opacifying microcapsules may be controlled within narrow limits by varying the amount of heat used to activate the capsules, i.e., drive out the oily core, or by the addition of a relatively small smount, e.g., 0.5 to 5 percent preferably, 2–3 percent by weight, of a natural of synthetic wax to the oily solution of the formaldehyde condensation product, or other suitable means. Thus, a wax modifying agent, such as candelilla wax, caranauba wax, low molecular weight synthetic waxes, such as polyethylene and paraffin waxes may be added to the oily polymeric solution to create a plasticizing effect on the walls of the microcapsule after the core solvent has been expelled through the permeable walls of the microcapsules during the early stages of drying. Subsequent application of heat may be employed to render the capsule walls impermeable.

The oil-soluble, partially condensed, thermosetting resins which may be used in various embodiments of this invention must also be of a hydrophobic nature in their solid, infusible state. Preferably, the thermosetting resins comprise the broad class of compositions defined as partially condensed, formaldehyde condensation products and include condensation reaction products of formaldehyde with phenols, such as hydroxybenzene (phenol), m-cresol and 3,5-xylenol; carbamides, such as urea; triazines, such as melamine; amino and amido compounds, such as aniline, p-toluenesulfonamide, ethyleneurea and guanidine. Under the influence of heat, these resins change irreversibly from a fusible and/or soluble material into an infusible and insoluble material.

Oil-soluble partially condensed resins can be prepared easily according to conventional practices. For example, the compatibility of the partially condensed resin with various oily solvents can be influenced by alkylating the resin with an alkanol, such as butanol or a combination of butanol with a higher alkanol, such as octyl alcohol or the like. The preparation of a suitable oil-soluble melamine formaldehyde and its modification with bultanol is described on pages 460–461 of *Preparative Methods of Polymer Chemistry*, by Wayne R. Sorenson (Inter-Science Publishers, 1961), the disclosure of which is hereby incorporated by reference.

The substitution of a portion of the butanol alkylating agent by the higher alkanol increases the compatibility of the resin, e.g., melamine formaldehyde, with the hydrocarbon solvent. The properties of such melamine resins are described on pages 192 and 193 of Amino Resins, by John F. Blais (Reinhold Publishing Corp., N. Y., 1959).

Brisk agitation is required in order to obtain very small droplets of the emulsion and, ultimately, very small capsules. Thus, microcapsules having diameters ranging from below about one micron and preferably between about 0.25 and about 0.8 micron may be produced according to the practice of this invention. Agitation may be achieved by means of a high speed mixer or impeller, by ultrasonic waves or by other conventional means. Agitation should be conducted in a manner such that the emulsion droplets have an average diameter below about 1 micron, preferably between about 0.25 and about 0.8 micron.

The wall thickness of the microcapsules of the present invention are approximately one-twentieth of the diameter of the microcapsule. Thus, opacifiers of the present invention having a diameter of between about 0.25 and about 1.0 micron have a wall thickness in the range of 0.0125 and about 0.05 micron, for example.

In addition to the above-described method, any suitable means of providing oil-containing precursor microcapsules, may be employed. For example, the method described in U.S. Pat. No. 3,418,656 to A. E. Vassiliades may be utilized. However, regardless of the manner of providing the oil-containing precursor microcapsules employed, the microcapsules are heated to temperatures which cause the oily material to volatilize and pass through the micropores in the solid walls of the microcapsules. The heating of the microcapsules may take place at any time subsequent to their formation. The oily material may be driven from the microcapsules either before or subsequent to their being coated onto the colored substrate. For example, a dispersion of the oil-containing microcapsules may be spray-dried so as to provide air-containing microcapsules, which may be then coated onto the substrate.

FIG. 1 illustrates the various alternative modes of producing a copy sheet coated with air-containing micrpcapsules.

In the encapsulating process shown in FIG. 1, the core is exemplified by an oily material, such as mineral spirits containing a low melting point wax and a formaldehyde condensation product which is admixed with an aqueous solution of an emulsifying agent, e.g., styrene-maleic acid copolyer, and agitation is continued until emulsion droplets having an average diameter less than 1 micron are produced. The microcapsules may be optionally cured, e.g., by heating the microcapsular dispersion, and then any one of many procedures may be followed. Thus, the microcapsular dispersion may be subjected, for example, to spray-drying at a temperature of, for example, between about 80° and about 100°C. to drive off the oily material through the micropores of the capsule walls and then the air-containing microcapsules may be coated onto the colored web and dried. Any suitable temperatures may be employed to drive the oily material from he microcapsules, so long as the microcapsules are not destroyed.

Alternatively, the oil-containing microcapsules may be coated onto the colored web and then the coated microcapsules may be heated to drive the oil therefrom.

Generally, there is sufficient residual emulsifying agent remaining in the microcapsular dispersion after separation of the resin and encapsulation of the emulsion that no additional binding agent need be used. Materials such as methyl cellulose, hydroxyethyl cellulose and polyvinyl acetate emulsions have been used conventionally as binding agents and may be employed in the present invention.

FIG. 2 represents a cross-sectional view of a manifold record system according to the present invention wherein a sheet 10 having a colored layer 12 is provided with a substantially uniform coating 14 of opacifiers having an average diameter below about 1 micron and containing air as the core material. A top copy sheet 16 having a colored surface 18 coated with microcapsular opacifiers 20 is superposed on sheet 10. The manifold record system of FIG. 2 may be employed in a ribbonless typewriter.

FIG. 3 represents a cross-sectional view of another manifold record system according to the present invention comprising an uncoated top sheet 122 which may be superimposed over sheet 110 which has a colored surface layer 112 that is coated in turn with a substantially uniform coating 114 of air-containing microcapsular opacifying agents. Sheet 110 is superimposed over sheet 116 which comprises a colored surface layer 118 and an opacifier overcoat layer 120.

FIG. 4 represents a substrate 216 having a colored surface 218 carrying a coating of microcapsular opacifying agents 220 that had been subjected to the pressure of a stylus along area 222 causing the destruction of the microcapsular opacifiers immediately below the stylus and resulting in the exposure of the underlying black surface 224.

The dry, pressure-sensitive copy systems of the present invention may be employed in a wide variety of applications where it is desired to make duplicate copies. Thus, the present record system may be utilized as a substitute for carbon paper, for forming duplicate sheets for computer readout, as manifold business forms, airline tickets, and nonerasible check paper. In addition, an important feature of the present invention is that the present copy systems have excellent suitability for use in printing operations, such as lithography, gravure printing, and the like, i.e., they will copy in printing, but the instant record systems will not smudge under normal handling conditions. Also, copy sheets of the present invention have excellent xerographability due to the fact that the scanner of such devices can "see" the microcapsular coating.

The following examples illustrate the production of air-containing microcapsular opacifiers and copy sheets employing same. The ream of paper as employed in the following examples comprises 500 sheets of 25 inch by 38 inch paper or a total of 3,300 square feet of paper. Likewise, the paper employed in the following examples is bond paper (32.5 pounds per ream).

EXAMPLE 1

A mixture comprising 2 grams of candelilla wax and 20 grams of a 50 percent solution of a butylated melamine formaldehyde resin in xylol-butanol dissolved in 80 grams of mineral spirits are emulsified in 150 grams of a 6 percent solution of the ammonium salt of a styrene-maleic acid copolymer and 10 grams of a 10 percent polyvinyl alcohol solution. The emulsification is conducted in a Waring blender. Emulsification is continued until the average particle diameter of the emulsion droplets is about 0.5 micron. This results in the production of oil-containing microcapsules.

The microcapsular dispersion is injected into a spray-dryer and the excess water and solvent is removed from the microcapsules at a temperature of about 90°C. thereby producing air-containing microcapsules. The resulting opacifiers are then suspended in a binder solution and are heated to further cross-link the resinous wall structure. In this manner, the hardness of the capsule may be further controlled depending upon the amount of heat applied to the capsules after the oily solvent and water of emulsification have been removed by drying. In this manner, a suspension of microcapsular opacifiers is produced.

EXAMPLE 2

The microcapsular opacifiers of Example 1 are coated onto a web of bond paper that had been previously dyed to a dark blue color employing phthalocyanine blue dye. The resulting paper web is white in appearance and when placed in a typewriter, clearly legible blue images are formed on the sheet by striking the sheet with typewriter keys. This causes the destruction of the opacifying microcapsules and exposes the underlying blue-colored substrate.

EXAMPLE 3

The microcapsular opacifiers of Example 1 are coated onto a web of white bond paper that had been previously coated on one side with a black coating composition comprising: 16 parts of a 39 percent by weight dispersion of carbon black in water; 100 parts of a clay filler (commercially available as Ultrawhite 90); 7 parts of a 50 percent by weight of an aqueous dispersion of a styrenebutadiene latex; 7 parts of a 7 percent by weight solution of a binder comprising the ammonium salt of a styrene-maleic acid copolymer as a binder; and 116 parts of water.

The resulting bond paper has a white surface on both sides. The microcapsular coating is subjected to ordinary writing pressures and the black substrate is exposed at points of pressure thereby providing a black image.

Example 4

Oil-containing microcapsules are produced in the manner described in Example 1, with the exception that a low molecular weight polyethylene is substituted for the candelilla wax is added to the oil phase. The resulting oil-containing microcapsular dispersion is coated onto a red-colored paper substrate and is dried at a normal paper drying temperature range of between about 50° and about 100°C. to drive the mineral spirits from the core of the capsule and provide air therein.

After the paper web has dried, it is subjected to ordinary pen writing pressures with a stylus resulting in the exposure of the underlying colored web. Again, clearly legible images are formed on the sheet.

EXAMPLE 5

The procedure of Example 4 is repeated substituting carnauba wax and paraffin wax, respectively, for the candelilla wax of that example in two separate experiments. The microcapsular dispersion is coated onto a yellow-colored paper web and dried at a temperature of about 90°C. When the resulting paper web is employed in a typewriter, excellent copy is produced as before.

EXAMPLE 6

The procedure of Example 1 is repeated with the exception that a 50 percent solution of urea-formaldehyde is substituted for the melamine formaldehyde of that example. The resulting oil-containing microcapsules are heated by spray-drying at a temperature of about 80°C., to remove the oily solvent and are dispersed in a binder soltuion and coated onto a colored paper web. When subjected to ordinary writing pressures, clear, sharp copy is produced.

Although the invention has been described in considerable detail with particular reference to certain preferred embodiments thereof, variations and modifications may be effected within the spirit and scope of the invention as described hereinabove and as defined in the appended claims.

What is claimed is:

1. A process for the production of a pressure-sensitive copy sheet, which comprises providing microcapsules containing a water-immiscible oily material and having a substantially uniform particle diameter, said microcapsules having an average particle diameter below about 1 micron, said oily material being vaporizable, heating said microcapsules under conditions so as to expel said oily material from said microcapsules and replace said oily material with air, coating the colored surface of a substrate with said microcapsules to provide an opaque coating thereon, said colored surface being exposable upon rupture of said microcapsules to provide a legible image on said substrate.

2. The process of claim 1 wherein said oily material is a volatile oil.

3. The process of claim 2 wherein said volatile oil is mineral spirits, benzene, xylene, toluene, styrene or turpentine.

4. The process of claim 3 wherein said volatile oil is mineral spirits.

5. The process of claim 1 wherein said microcapsules are heated while being spray-dried so as to expel said oily material from said microcapsules.

6. The process of claim 1 wherein said microcapsules have walls comprising a melamine-formaldehyde or a urea-formaldehyde condensation product.

7. The process of claim 1 wherein said microcapsules have capsule walls comprising polyvinyl alcohol, methyl cellulose or a substituted starch.

8. The process of claim 1 wherein said microcapsules containing an oily material are produced by a method which comprises admixing an oily solution comprising an oil-soluble, partially-condensed, thermosetting condensation product in a water-immiscible oily material; and an aqueous solution of a water-soluble polymeric material to form an emulsion, said thermosetting condensation product and said water-soluble polymeric material being capable of interacting to form a solid, cross-linked resinous material, subjecting said emulsion to conditions whereby said polymeric materials react to form microcapsules having solid capsular walls about a nucleus of said oily material.

9. A process for the production of a pressure-sensitive copy sheet which comprises providing microcapsules containing a water-immiscible oily material and having a substantially uniform particle diameter, said microcapsules having an average particle diameter below about 1 micron, said oily material being vaporizable, coating said microcapsules onto the colored surface of a substrate, heating said surface having said microcapsules thereon to expel said oily material from said microcapsules and replace said oily material with air thereby providing said surface with an opaque coating, said colored surface being exposable upon rupture of said microcapsules to provide a legible image on said substrate.

10. The process of claim 9 wherein said oily material is a volatile oil.

11. The process of claim 10 wherein said volatile oil is mineral spirits, benzene, xylene, toluene, styrene, or turpentine.

12. The process of claim 11 wherein said volatile oil is mineral spirits.

13. The process of claim 9 wherein said surface is heated to temperatures in the range of between about 85° and about 100°C.

14. The process of claim 9 wherein said microcapsules have walls comprising a melamine-formaldehyde or a urea-formaldehyde condensation product.

15. The process of claim 9 wherein said microcapsules have capsule walls comprising polyvinyl alcohol, methyl cellulose or a substituted starch.

16. The process of claim 9 wherein said microcapsules containing an oily material are produced by a method which comprises admixing an oily solution comprising an oil-soluble, partially-condensed, thermosetting condensation product in an water-immiscible oily material; and an aqueous solution of a water-soluble polymeric material to form an emulsion, said thermosetting condensation product and said water-soluble polymeric material being capable of interacting to form a solid, cross-linked resinous material, subjecting said emulsion to conditions whereby said polymeric materials react to form microcapsules having solid capsular walls about a nucleus of said oily material.

* * * * *